United States Patent [19]

Schick et al.

[11] Patent Number: 5,180,902

[45] Date of Patent: Jan. 19, 1993

[54] SELF VERIFYING TRANSACTION CARD WITH DISABLING CAPABILITY

[76] Inventors: David Schick, 150-54 76th Rd.; Mark Bane, 141-17 72nd Crescent, both of, Flushing, N.Y. 11367

[21] Appl. No.: 701,794

[22] Filed: May 17, 1991

Related U.S. Application Data

[63] Continuation-in-part of Ser. No. 184,251, Apr. 21, 1988, abandoned.

[51] Int. Cl.$^5$ .............................................. G06K 5/00
[52] U.S. Cl. ..................................... 235/380; 235/379
[58] Field of Search ............................... 235/379, 380; 340/825.33

[56] References Cited

U.S. PATENT DOCUMENTS

| | | | |
|---|---|---|---|
| 4,523,087 | 6/1985 | Benton | 235/380 |
| 4,614,861 | 9/1986 | Pavlov et al. | 235/380 |
| 4,697,072 | 9/1987 | Kawana | 235/379 |
| 4,766,293 | 8/1988 | Boston | 235/379 |
| 4,879,455 | 11/1989 | Butterworth et al. | 235/380 |
| 4,998,279 | 3/1991 | Weiss | 235/382 |
| 5,023,908 | 6/1991 | Weiss | 235/380 |
| 5,034,597 | 7/1991 | Atsumi et al. | 235/380 |

Primary Examiner—John W. Shepperd
Attorney, Agent, or Firm—Israel Nissenbaum

[57] ABSTRACT

A self verifying transaction card having a self contained keyboard or keypad for entering a personal identification code, a simplified verification display comprised of light emitting diodes (LED's) which light up in a pre-determined configuration for validation of a verification check, a non-volatile memory with a stored code, and a self contained power supply. The card further contains circuitry for comparison of an entry with the stored code, with a pre-determined successive number of improper entries serving to disable the card from further identification functions and transactions. Clock/calendar timer and a contained microprocessor or microcontroller cause the verification function to be disabled at the expiration date of the card. The clock/calendar timer also provides a basis for uniquely correlating the time and date of a transaction to a changing verification display. A proper verification configuration at the time of transaction is not determinable and fraudulent transactions by merchants are prevented. In one embodiment the LED display is modulated to blink rapidly to conserve energy and to optically transmit data from the card to a remote terminal.

6 Claims, 5 Drawing Sheets

1. ACTIVE PERIOD TIMING

2. DATA BURST TIMING

3. BITSTREAM TIMING

SELF VERIFYING TRANSACTION CARD WITH DISABLING CAPABILITY

This is a continuation-in-part of application Ser. No. 07/184,251 filed Apr. 21, 1988, now abandoned.

This invention relates to verification of proper usage by both card-holders and merchants of transaction cards and particularly to self verification cards.

Current widely used transaction cards such as the credit cards under the names Visa, Mastercard, American Express, Discovery and the like are comprised of plastic with embossed information, i.e. cardholder name, transaction card number and expiration date. Each card also has a signature strip and a magnetic tape strip for verification information. In their wide proliferation, credit cards represent several security risks, entailing millions of dollars in losses because of improper or unauthorized use. Two major categories of improper use are counterfeiting and the use of stolen cards. To obviate the successful counterfeiting of such cards it has currently become the practice to include holograms on the card to render counterfeiting more difficult. In order to alleviate the financial burden of stolen credit cards a cardholder's liability is by law limited, generally to a maximum of $50, and if the credit card issuing financial institution is informed within 24 hours of loss there is no liability to the cardholder. In any event, the financial institutions are suffering unrecompensated losses in the tens and possibly of millions of dollars per year. There is accordingly a great deal of effort currently being expended in enhancing the security of credit card transactions. These efforts have centered upon verification of the card holder as the person authorized to utilize the card. Generally this has been accomplished by issuing the card holder of PIN (personal identification number) which is encoded on the magnetic strip of the card but which is otherwise not evident on the face of the card. Such PIN identification has been most widely utilized in conjunction with automated teller machines (ATM's) which are programmed to be operable by an inserted card with an appropriate PIN which it reads from the magnetic tape. While this security system has, for the most part, been successful it is not a viable one for general credit card transactions since ti involves the necessity of providing every merchant who accepts the card with PIN accepting and card reading devices, a clearly uneconomic alternative. Many of the current security developments require similar interfacing of a transaction card with external devices for verification of the card holder's authority to use the card with the same economical and logistic drawbacks.

Self contained identification cards have been developed such as described in U.S. Pat. Nos. 4,692,601 and 4,697,072 wherein the cards have keyboards for the external entry of secret data or codes which in turn cause the visual display of an approval code or number which verifies a transaction. An improper entry results in no verification being displayed. In U.S. Pat. No. 4,879,455 simple LED's light up to signify whether the car is to be accepted or rejected.

While the cards in the aforementioned patents provide verification of the cardholder, however in addition to verification of the proper card owner it is important for the card-issuing financial institution to verify the validity of the transaction itself. Without such verification, unscrupulous merchants, once having obtained a non-changing approval code, may readily falsify transaction.

It is an object of the present invention to further improve the security of self verifying transaction cards by providing such cards with means for entering a PIN number and comparator means to deactivate the card from any further utilization upon a predetermined pattern of misuse.

It is a further object of the present invention to enhance the control by card issuing authorities by providing such self verifying transaction cards with an issuing time and a clock/calendar circuit for providing only a pre-determined lifetime.

It is still further object of the present invention to provide the self verifying transaction cards with a relatively economical LED verifying display with such display providing a unique changeable verification configuration determined by the time and date of card activation relative to the time and date of the transaction.

It is another object of the present invention to modulate the LED illumination output into a blinking pattern to conserve power and to transmit information via an optical reader to a remote terminal.

These and other objects, features and advantages of the present invention will become more evident from the following discussion and the drawings in which.

Figure 1:
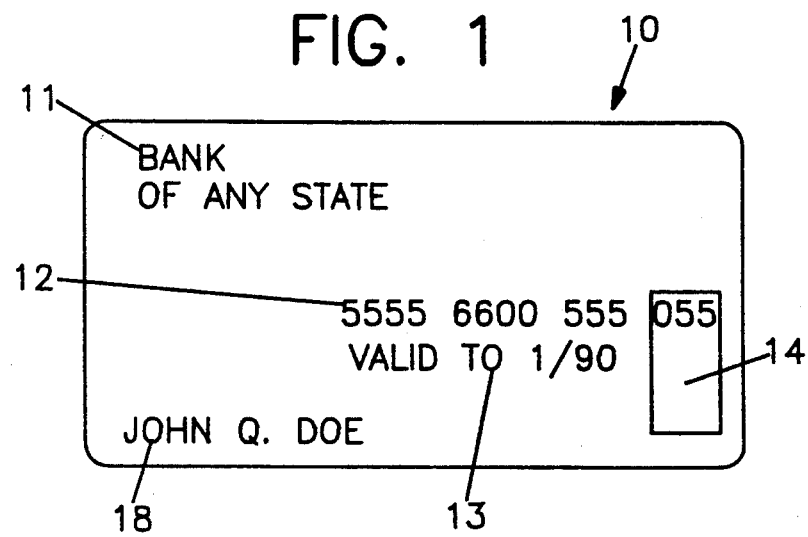
FIG. 1 is a front view of the transaction card of the present invention.

Generally the present invention comprises a self verifying transaction card having self contained means for entering a personal identification code, a non-volatile memory with the stored code, a self contained power supply, and a verification display comprised of light emitting diodes (LED's). The LED display provides the important economic advantage of a simplified lighting circuit without the necessity for the logic circuitry such as is required by an LCD display, as in the aforementioned patents, which are designed to exhibit various alphanumeric characters. As opposed to LCD displays, the LED's are also optically scannable and can transmit information by a modulated blinking pattern. The blinking also serves to conserve battery power. The card further contains circuitry for comparison of an entry with the stored code. A pre-determined successive number of improper entries within a specific time period causes disabling means to disable the card from further identification functions and transactions. A valid entry activates the LED's in a predetermined configuration for a sort time period sufficient to indicate a valid card holder. The configuration is noted on a transaction record to complete the verification procedure. The card also contains clock/calendar timing means whereby the verification function is disabled at the expiration date of the card. The clock/calendar timing means provides means for uniquely changing the verification configuration to a predetermined alphanumeric configuration based on the time and date of the transaction relative to the time and date of activation of the card. By providing a unique undeterminable verification configuration, unscrupulous merchants are prevented from submitting fraudulent transaction since they cannot also provide a proper verification code for the specific card.

The card of the present invention is constructed of embossed plastic in a manner similar to those of the common transaction cards and it can in fact be similarly utilized. Front and rear plastic layers sandwich electrical circuitry and a power supply therebetween and are peripherally sealed to each other to provide a substantially hermetic closure. The power supply is a thin wafer battery preferably a non-aqueous lithium battery (with high capacity and without detrimental gassing). The card embodies a membrane type keyboard with alpha, numeric or alpha-numeric characters, as desired, for the entry of a predetermined personal identification code such as a three or four digit number. In order to prevent a random determination of a numerical code, the circuitry within the card of the present invention contains a comparator and timer circuit which upon the entry of a successive pre-determined number of incorrect entries within a specific time period instructs disabling means to deactivate the card from any further use, whether or not. Upon proper activation of the identification function, i.e. a match within the comparator circuit, one or more LED's with a distinctive time and date/predetermined configuration lights up. A record is made of such configuration with the time and date of a transaction in order to verify that identification, with card use authorization, was properly made prior to any card transaction and that the transaction was a valid one. The card of the present invention further includes a signature strip and the ubiquitous magnetic strip for read/write card storage information whereby the card can be compatible with existing transaction card verification and record keeping. In alternative embodiments the LED display flashes to indicate that a key has been depressed.

An example of the non-volatile memory and comparator circuitry for the card of the present invention include the relatively low cost single chip CMOS microcontrollers from National Semiconductor Corporation designated COP410C, COP411C, COP310C and COP311C.

In the verification of cards for utilization in a transaction it is not sufficient for bank issued credit cards to simply enter a PIN validation. It is required that there is some method of confirming the validity of the card output code in order to ensure that merchants are unable to falsify the code on sales receipts to create bogus transactions.

Figure 2:
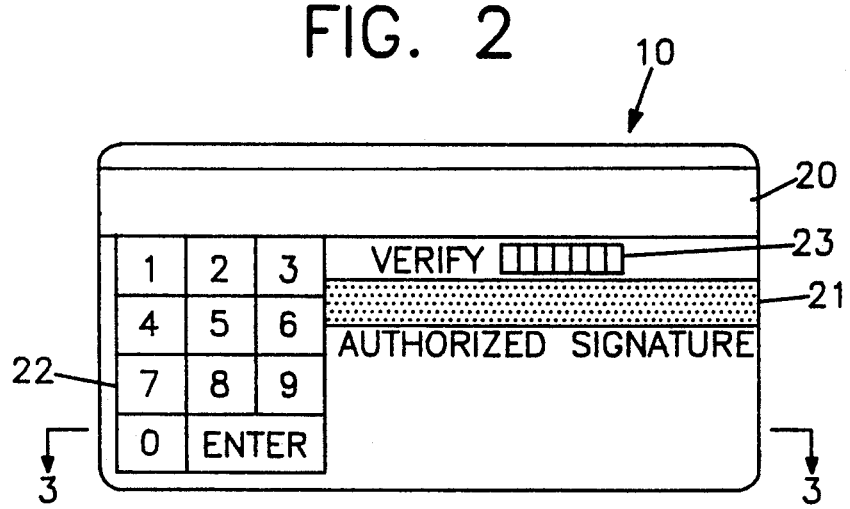
FIG. 2 is a rear view of the transaction card of FIG. 1.
Figure 3:
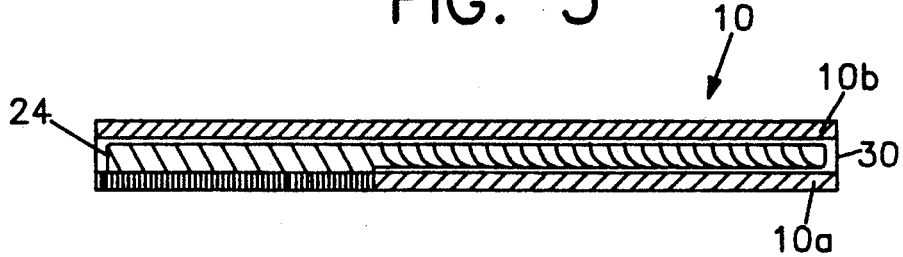
FIG. 3 is a cross-section of the card of FIG. 2 taken along line 3—3.

With specific reference to the drawings, FIG. 1 depicts the front of the self verifying card 10 having the typical information of issuing institution 11, embossed identification number 12, embossed name of the card holder 12, embossed dates of validity 13, and hologram 14. In all respects the front of the card is similar if not identical to typical transaction cards such as credit cards. FIG. 2 shows the rear of card 10 with magnetic strip 20, and signature strip 21 such as on the typical transaction card. In addition, flat membrane keyboard 22 (a numerical keyboard is shown) serves as the means to enter a specific code into the card which, if valid, activates LED's 23 by illuminating them in a specific configuration. As seen in FIG. 3, the card 10 is comprised of two plastic layers 10A and 10B sandwiching a circuitry board 30 and the conductive rubber pad keys 24 therebetween. The total thickness of the card is the same as that of existing cards (0.76 mm) in order to maintain compatibility with existing transaction card equipment.

Figure 4:
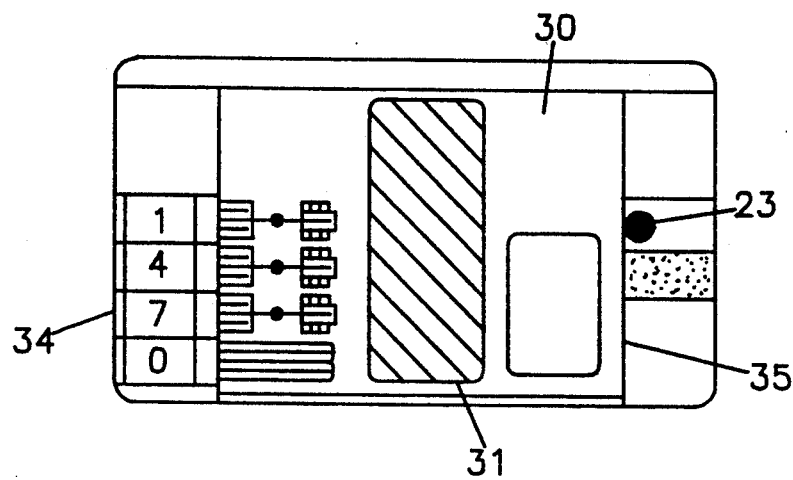
FIG. 4 is a cut away view of the card of FIG. 2 with the outer plastic layer removed.
Figure 5A:
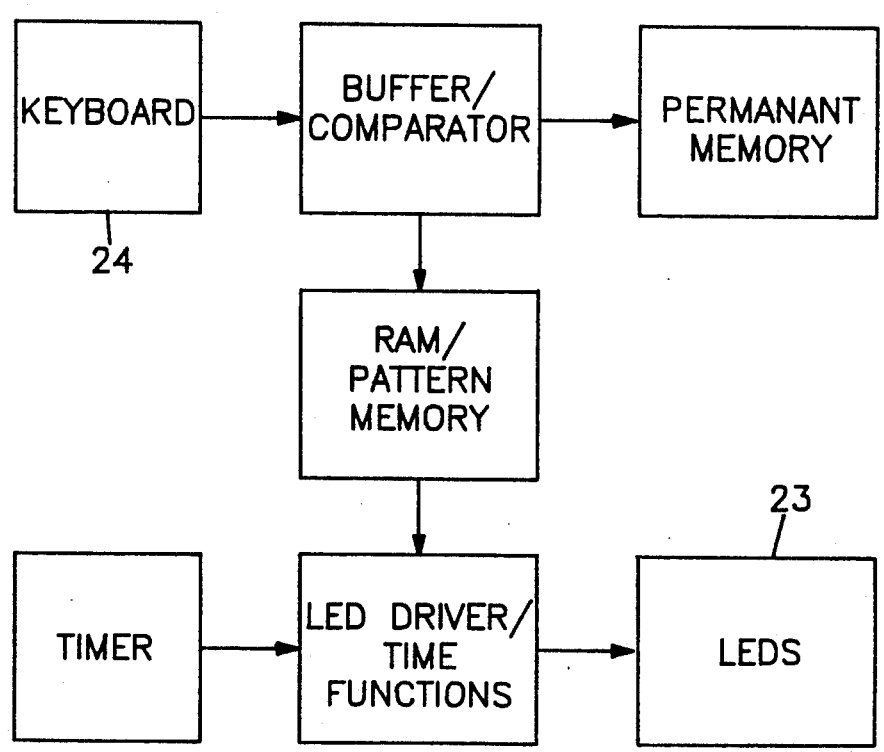
FIG. 5a is a block diagram of the circuitry contained in the card of FIG. 2 relating to improper use deactivation

FIG. 4 exemplifies the positioning of the electrical components and their interrelation. Lithium wafer battery 31 such as of the non-aqueous $Li/MnO_2$ or $Li/CF_x$ type (if the typical drain rate is low a solid state lithium battery may be utilized) is protectively fitted within a recess in circuitry board 30 and is electrically connected in series with keyboard entry wiring 34 and microcontroller 35 with the latter containing both non-volatile memory with stored code and comparator with time circuitry. LED display 23 completes the circuitry. As shown in FIG. 5a the keyboard or keypad 24 provides the means for entry of a code into a buffer comparator for comparison with a code stored in permanent memory. The results of the comparison are sent to the RAM to add to the pattern-of-use database and the pattern of wrong attempts records. The RAM/pattern memory determines the correctness or malicious entry of a series of incorrect entries in conjunction with the timer circuit within a pre-determined period of time (arbitrated with the timer information) in order to determine the proper output to the LED display. If a proper code is entered, the LED driver activates the LED's with the illumination thereof in the pre-determined configuration. The pre-determined configuration is noted as part of a transaction to indicated that verification was in fact properly determined during the transaction. Repeated incorrect entries which reach a predetermined number deactivates the comparator circuitry and a validation is no longer possible with the card. In addition the timer circuit further contains calendar circuitry whereby the comparator is similarly deactivated on the expiration date of the card.

Figure 5B:
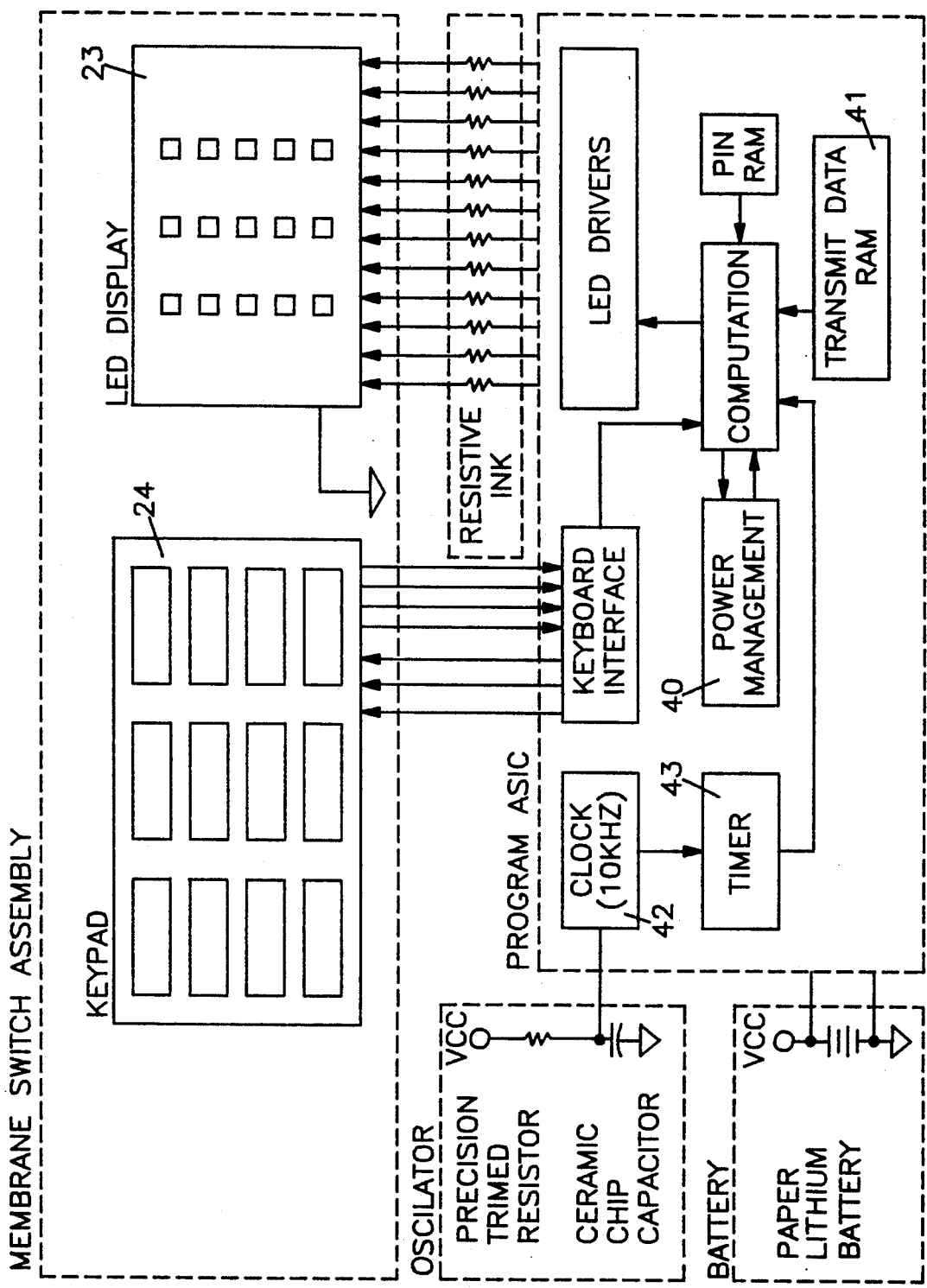
FIG. 5b is a block diagram of the circuitry contained in the card of FIG. 2 relating to the unique verification display.

FIG. 5b schematically depicts the card's circuitry for power management 40 and modulation for external transmission of data with transmit data RAM 41. Clock 42 and timer 43 operates in tandem in keeping track of actual time and date and the total elapsed time from activation of the card in order to provide a unique verification code.

The following is a specific example of the means by which the card of the present invention provides and validates its alphanumeric verification code. Details contained therein are not to be construed as limitations on the present invention.

EXAMPLE 1

The LED display of a card is capable of displaying up to 32 different characters. When the card is initially activated during manufacture, a contained elapsed time counter keeps a running determination of the length of time that the card has been active for. This same counter determines the time when the disabling means deactivates the card upon its expiration date.

Time windows are created by the card which correlate to each of the 32 characters. When the PIN is entered, the card calculates which character corresponds to the current window and sends it to the LED display. Each card has its own unique window length and its own sequence of alphanumeric codes, with the window length varying from 512 to 1024 seconds. The card keeps a running count of windows based on a precision 1 second counter within the card and a 10 bit digital word which tells the card what the window length should be. Since the total like of a typical card is 18 months, the card is able to count up to 47,336,400 seconds, or a maximum of 61,679 time windows (at 512 seconds/window). The number of elapsed windows is stored in a 17 bit digital word.

Figure 6:
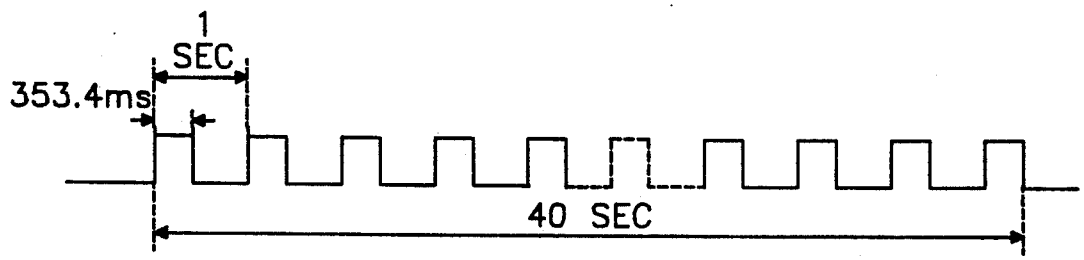
FIG. 6 is a schematic example of an optically readable data burst transmission from the card of the present invention.
Figure 6:
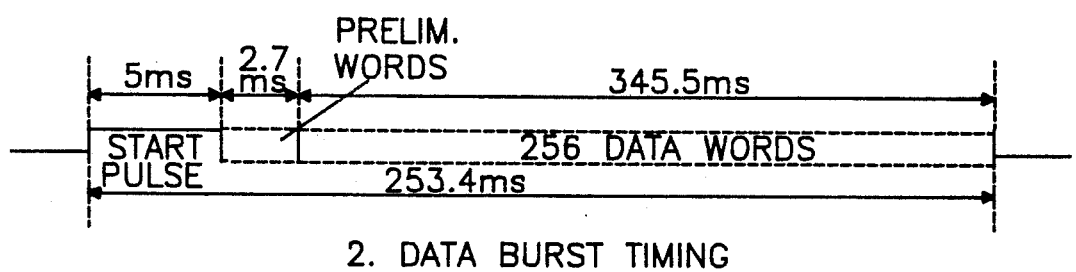
Figure 6:
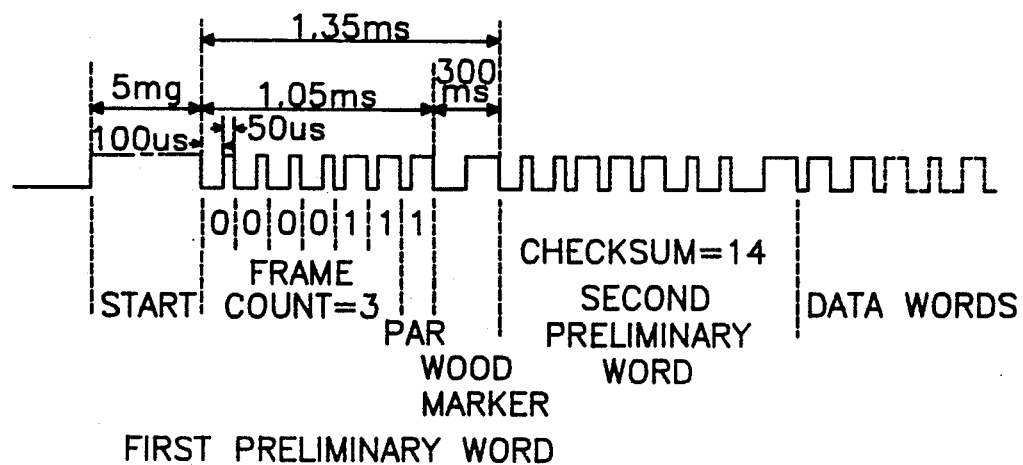

The alphanumeric codes are stored as an array of 15 bit words (to correlate to a preferred 15 segment LED display) by 32 words. The order in which the codes are stored is unique to each card with over 4 billion possible sequences. In order to generate a 5 bit address to index the proper code, the card breaks the 17 bit window counter into four 4 bit words plus a remainder bit performing a series of four 4 bit additions. The result is used for the 4 most significant bits of the code address with the remaining bits obtained from the least significant bit of the 17 bit window counter. FIG. 6 schematically depicts a verification code algorithm as described.

In order to regenerate the code at a remote location, a database is maintained which contains the following information for each card:

1. Turn-on time
2. Window length
3. Code sequence

Verification of the validity of a code is accomplished by using the information in the database to simulate the operation of the card. However, instead of using a running time count, the verification process imply divides the operating time of the card by the window length and calculates the code address. To avoid problems with time inaccuracies at the location of the transaction, the verifier also calculates the valid code for the time windows directly prior to and subsequent to the actual window. This allows for both human error and drift in the card's built-in clock/calendar. For proper operation the timer or clock/calendar must be accurate to one window out of 18 months or about 1080 parts-per-million.

The following is a specific example of the card functioning to transmit data to a remote terminal. It is understood that it is exemplary in nature and specifics contained therein are not to be construed as limitations on the present invention.

EXAMPLE 2

In a preferred embodiment the LED display of the card consists of 15 segments of high efficiency red LED display driven by the card's processor. When the LED's are activated, the processor rapidly modulates the drive signals thereby causing the display to blink at a rate too rapid for the eye to detect but which is readable by an optical sensor such as a photodiode. The length of the blinks are varied to transmit an asynchronous data stream which is decoded by a remote terminal.

The display is active for a maximum of 40 seconds which is more than sufficient to complete a typical verification. During the active time, the LED's blink at a relatively slow rate of 1 HZ to conserve power and the blinks consist of 353.3 ms of active time followed by 646.7 ms of blank time. During the active time when the LED's are visible, a burst of 256 data words are transmitted.

At the start of the transmission there is a 5 ms "start" pulse which the terminal detects to prepare for receipt of a new burst of data. The start pulse is followed by a bit stream with each bit consisting of a 150 frame. A one is indicated by a 50 $\mu$s OFF pulse followed by a 100 $\mu$s ON pulse. A zero is indicated by a 100 $\mu$s OFF pulse followed by a 50 $\mu$s ON pulse. A data word consists of six bits, followed by a parity bit, and a word marker consisting of a 150 $\mu$s ON pulse.

Figure 7:
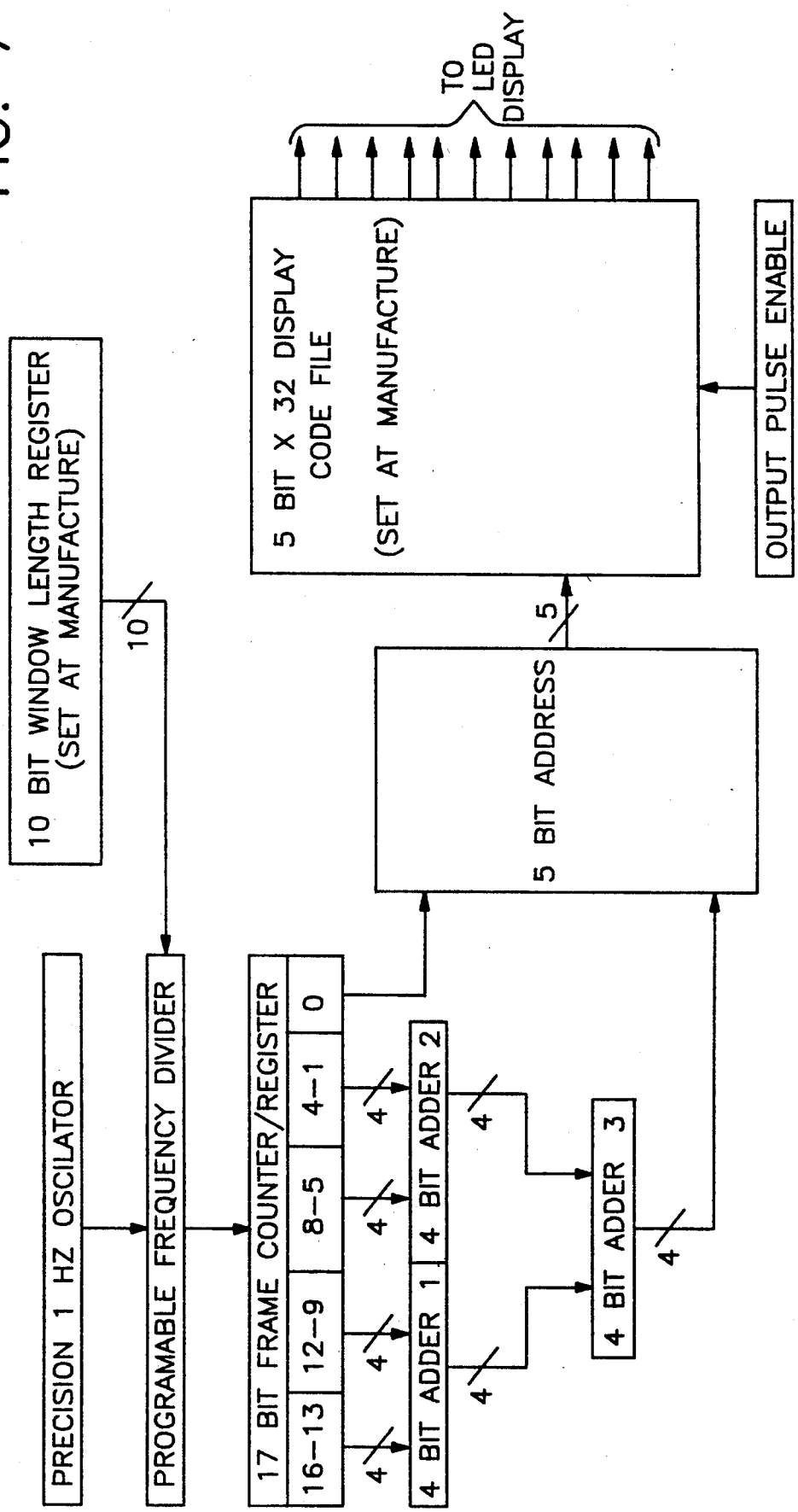
FIG. 7 is a block diagram of a uniquely encoded verification algorithm.

Before transmission of data, two preliminary words are transmitted. The first contains a frame number which indicates which data set is being transmitted (if the card is transmitting more than 256 data words). The second word contains a checksum to validate the data in the burst. Transmission time for each word is 1.35 ms and 256 words are transmitted in 345.6 ms. With the 5 ms start pulse and the two preliminary words, the total transmit time is 353.3 ms. If the card is active for the full 40 seconds, more than 10,000 can be transmitted. More realistically the card remains active for about 5 seconds during a typical verification transaction with about 1,280 being transmitted. FIG. 7 schematically depicts a timing diagram of the active data burst and bitstream timing data transmission as described.

The advantage of transmission of data in this manner is that the card transmits the alphanumeric verification code displayed together with account information of the cardholder. This allows the card to be use din applications such as with Automatic Teller Machines (ATM). The advantage in using the LED card to access terminals rather than by the direct entry of a PIN is that the verification code is already securely encrypted data and it can be immediately passed along phone lines. PIN's, on the other hand require immediate encryption before being sent along phone lines. This requires complex algorithms and hardware which must be packaged in a physically secured "black box". In addition a complex system of "encryption keys" must be implemented for decoding by the host system.

Because of its lost cost and high security, the card of the present invention can be readily and economically utilized in applications such as home banking, transaction such as car rentals, airplane and hotel reservations and utility bills payments. A profile of the cardholder containing travel preferences, driver information, frequent flier accounts and the like may be transmitted together with verification data to facilitate transactions.

It is understood that the above examples and discussion are illustrative of the present invention and details contained therein are not to be construed as a limitation on the present invention. Changes can be made in card component construction and function without departing from the scope of the present invention as defined in the following claims.

What is claimed is:

1. A self verifying transaction card having a keyboard for entering a personal identification code, a nonvolatile memory with a stored code, a self contained non-replaceable power supply sealed within said card, clock/calendar means for determining real time and a timer for measuring elapsed time from activation of the card, a verification display consisting essentially of one or more light emitting diodes (LED's) forming an alphanumeric verification configuration, one or more LED drivers, RAM for entry of access codes, and comparator circuitry for comparison of entry of an access code with the stored code; whereby entry of an access code, as a personal identification code, via said keyboard, into the RAM, activates the comparator circuitry to compare the entered personal identification code with the stored code in the non-volatile memory, with a match between the entered code and the stored code resulting in the comparator circuitry activating the one or more LED drivers, which in turn illuminate the one or more light emitting diodes into a pre-determined verification configuration as a verification display, wherein said verification display changes according to a preset algorithm contained in the non-volatile memory; said algorithm relating time and date of a transaction, as determined by said clock/calendar means, to the elapsed time from activation of the card to the time of a transaction, as determined by the timer means; whereby during a predetermined time length window a unique pre-determined verification configuration is generated and displayed by said one or more LED's, wherein different verification configurations are generated and displayed during different time windows, wherein the card further contains means for modulating the output of the one or more LED's whereby the one or more LED's blink in a pattern to provide alphanumeric information readable by an optical reader for transmission to a remote terminal, and wherein said one or more LED's blink at a slow rate with periods of active time when said LED's are powered and visible and periods of blank time when said LED's are not powered and are not visible, to conserve power of said non-replaceable power source.

2. The card of claim 1 wherein the means for modulating the output of the one or more LED's outputs the verification code to the remote terminal.

3. The self verifying transaction card of claim 1 wherein said card further contains pattern memory means with preprogrammed pattern of improper use, and comparator circuitry with timing means for comparison of an entry with the stored code; whereby entry of a personal identification code, via said keyboard, into RAM activates the comparator circuitry to compare the entered personal identification code with the stored code in the non-volatile memory, wherein entry of a pre-determined successive number of improper entries, as determined from preprogrammed instructions contained in the pattern memory means, within a specific pre-determined time period, as determined by said timing means, activates means for causing the card to be disabled from further verification functions and transactions.

4. The self verifying transaction card of claim 1 wherein said keyboard for entering a personal identification code comprises a membrane keyboard and said self contained power supply comprises a wafer battery.

5. The self verifying transaction card of claim 3 wherein said card further contains an expiration date entered into said non-volatile memory, whereby said expiration date is compared to the current date of said timer and when said expiration time is reached, the comparator circuitry and the verification function are disabled.

6. The self verifying transaction card of claim 5 wherein said comparator with timing means is comprised of a single chip CMOS microcontroller.

* * * * *